US 6,697,322 B2

(12) United States Patent
Oumi et al.

(10) Patent No.: US 6,697,322 B2
(45) Date of Patent: Feb. 24, 2004

(54) RECORDING MEDIUM, OPTICAL RECORDING DEVICE UTILIZING RECORDING MEDIUM, AND METHOD OF MANUFACTURING RECORDING MEDIUM

(75) Inventors: Manabu Oumi, Chiba (JP); Nobuyuki Kasama, Chiba (JP); Hidetaka Maeda, Chiba (JP); Kenji Kato, Chiba (JP); Takashi Niwa, Chiba (JP); Yasuyuki Mitsuoka, Chiba (JP); Yoko Shinohara, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 09/770,072

(22) Filed: Jan. 25, 2001

(65) Prior Publication Data

US 2001/0030938 A1 Oct. 18, 2001

(51) Int. Cl.[7] .............................. G11B 3/70; G11B 5/84; G11B 7/26
(52) U.S. Cl. .................................................. 369/272
(58) Field of Search ................ 369/272, 275, 369/283, 284, 288

(56) References Cited

U.S. PATENT DOCUMENTS

| 4,343,879 A | * | 8/1982 | Drexler et al. | 346/135.1 |
| 4,465,767 A | * | 8/1984 | Oba et al. | 346/135.1 |
| 4,477,555 A | * | 10/1984 | Oba et al. | 346/135.1 |
| 4,640,860 A | | 2/1987 | Ritchie | 428/143 |
| 5,598,387 A | | 1/1997 | Pohl | 369/44.37 |
| 5,602,819 A | * | 2/1997 | Inagaki et al. | 369/275.4 |

(List continued on next page.)

FOREIGN PATENT DOCUMENTS

| EP | 0594194 | | 4/1994 |
| EP | 0688014 | | 12/1995 |
| EP | 0860726 | | 8/1998 |
| JP | 61-153842 A | * | 7/1986 |
| JP | 61-153843 A | * | 7/1986 |
| JP | 2-308423 A | * | 12/1990 |
| JP | 4-62090 A | * | 2/1992 |
| JP | 6-139620 A | * | 5/1994 |
| JP | 11-73680 A | * | 3/1999 |
| JP | 11328725 | | 11/1999 |

OTHER PUBLICATIONS

Ebbesen, T.W. et al, "Extraordinary Optical Transmission Through Sub-wavelength Hole Arrays", Feb. 12, 1998, Nature (Macmillan Publishers Ltd), v. 391, pp. 667–669.*
Thio, T. et al, "Surface-Plasmon-Enhanced Transmission Through Hole Arrays in Cr Films", Oct. 1999, J. Opt. Soc. Am., c. 16, n. 10, pp. 1743–1748.*
Klar, T. et al: "Surface Plasmon Resonances in Single Metallic Nanoparticles" Physical Review Letters, vol. 80, No. 19, May 11, 1998.
Kume, T et al: "Light emission from surface plasmon polarizations mediated by metallic fine particles" Physical Review, B. Condensed Matter., XP002228811 American Institute of Physics. New York., US.
Ditlbacher H et al: "Spectrally Coded Optical Data Storage by Metal Manoparticles" Optics Letters, Optical Society of America, Washington, US, vol. 25, No. 8, Apr. 15, 2000.

Primary Examiner—Julie Anne Watko
(74) Attorney, Agent, or Firm—Adams & Wilks

(57) ABSTRACT

A recording medium for recording and reproducing information utilizing near field light has a transparent substrate and a data mark arrangement layer disposed over a surface of the transparent substrate. A metal particulate is dispersed only in the data mark arrangement layer so that a surface plasma is generated upon interaction of the data mark arrangement layer with near field light generated by incident light or irradiating light to thereby amplify the intensity of scattered light generated as a result of the interaction between the data mark arrangement layer and the near field light.

21 Claims, 9 Drawing Sheets

U.S. PATENT DOCUMENTS 6,243,350 B1 * 6/2001 Knight et al. ........... 369/112.24
6,285,652 B1 * 9/2001 Tsai et al. ................ 369/275.1
6,348,251 B1 * 2/2002 Tsai et al. .................. 428/64.1
6,358,589 B1 * 3/2002 Tsai et al. .................. 428/64.1
6,410,115 B1 * 6/2002 Tsai et al. .................. 428/64.1
6,448,543 B1 * 9/2002 Mitsuoka et al. ......... 250/201.3
6,449,221 B1 * 9/2002 Knight et al. ............ 369/13.35
2002/0136142 A1 * 9/2002 Jung et al. .................... 369/94

* cited by examiner

RECORDING MEDIUM, OPTICAL RECORDING DEVICE UTILIZING RECORDING MEDIUM, AND METHOD OF MANUFACTURING RECORDING MEDIUM

BACKGROUND OF THE INVENTION

Field of the Invention

The present invention relates to a recording medium, near field optical head, and optical recording device capable of utilizing near field light to record and reproduce information in a highly precise manner, and to a manufacturing method thereof.

Typically, Scanning Probe Microscopes (SPMs) are used in Scanning Tunnel Microscopes (STMs) and Atomic Force Microscopes (AFMs) for monitoring microscopic regions in the order of a few nanometers of a sample surface, An SPM monitors a sample surface with a probe having a pointed tip. Mutual interaction of tunnel currents and interatomic forces occurring between the probe and the sample surface are then taken as subjects of monitoring and an image of a resolution depending upon the shape of the probe tip can be obtained, This does, however, place relatively severe constraints on the sample being monitored.

Near field optical microscopes where the subject of the monitoring is taken to be the mutual interaction occurring between the near field light generated at the sample surface and the probe so that it is possible to monitor microscopic regions of the sample surface have recently come to the forefront.

With these near field optical microscopes, propagating light illuminates the surface of the sample so as to generate near field light. Near field light generated in this manner is then scattered by a probe with a pointed tip and this scattered light is processed in the same manner as the detection of propagated light in the related art. This eliminates the boundaries in monitoring resolution of related optical microscopes and enables observation of even more microscopic regions. The observation of the optical properties of the sample occurring at microscopic regions can therefore by achieved by sweeping the wavelength of the light the sample surface is illuminated with.

In addition to utilization as a microscope, applications are also possible in high-density optical memory recording where near field light of a high energy density is generated at a microscopic opening of the optical fiber probe by introducing light of relatively substantial intensity to the sample via the optical fiber probe so as to cause the structure or the physical properties of the sample surface to be changed in a localized manner by this near field light.

Cantilever optical probes as disclosed, for example, in U.S. Pat. No. 5,294,790 where an opening passing through a silicon substrate is formed using semiconductor manufacturing technology such as photolithography etc., an insulation film is formed on one side of the silicon substrate, and a conical optical waveguide layer is formed on the insulation film on the opposite side to the opening have also been put forward as probes for use in near-field optical microscopes. With this kind of cantilever-type optical probe, an optical fiber is inserted into the opening, and light is made to pass through a microscopic opening formed by coating everything but the tip of the optical waveguide layer with a metal film.

The use of flat probes that do not have pointed tips as the aforementioned probes do has also been proposed. This plane probe is formed with an opening having a conical structure, by anisotropic etching of a silicon substrate, with a vertex that is a few tens of nanometers across which can be passed through. Making a plurality of plane probes of this structure on the same substrate using semiconductor manufacturing technology, i.e. making an array of plane probes, is straightforward and utilization in optical memory heads for reproducing and recording optical memory using near field light is possible. Flying heads as used in related hard discs and having plane probes have also been put forward as optical heads employing this plane probe. Such flying heads are designed such that aerodynamic force causes the heads to float 50 to 100 nanometers from the recording medium. A microscopic opening is formed in the recording medium side of the flying head and near field light is generated so as to perform optical recording and reproduction A schematic view of a near field optical information recording/reproduction device employing this kind of flying head is shown in FIG. 1. Here, a near field optical head 5 is fitted to the end of a suspension arm 10. The near field optical head 5 scans the surface of the recording medium 1 while floating a few tens of nanometers from the surface of the recording medium 1 due to air pressure received from a disc recording medium 1 rotating at high-speed. At the near field optical head 5, light from the laser light source (omitted from the drawings) is focussed at the lens so as to be made incident. The surface of the recording medium 1 and the near field optical head 5 mutually interact via the near field light so that scattered light generated as a result is taken as an output signal detected by an optical sensing element (not shown in the drawings).

However, because this kind of optical memory utilizes near field light, ultra-high density optical memory below the optical diffraction limit can be realized but unfortunately, on the other hand, the efficiency with which light can be utilized is lowered, and very little light is received by the light-receiving element.

In order to resolve this problem, in the related art, the intensity of the laser light employed is made strong or the conical structure of the plane probe constituting the near field light head is filled with a ball lens etc.

However, when the intensity of the laser light is increased, new problems with regards to heat generated and power consumed occur. Further, when a ball lens is employed, it is necessary to align the position of the ball lens which causes costs to increase. This has the result that it is difficult to adjust the focal point of light at an opening for all the near field optical heads during large-scale production due to variations in the individual ball lenses.

It is therefore also difficult to bring about ultra-high density memory utilizing near field light while maintaining low power consumption and mass production at a low price.

In order to resolve the problems of the method of the related art while increasing the efficiency with which light is utilized, it is the object of the present invention to implement a structure utilizing a plasma (hereinafter referred to as "plasmon" mechanism where optical energy is temporarily converted into plasmon energy of a metal particulate and is then converted back to being optical energy after passing through a microscopic region.

SUMMARY OF THE INVENTION

In order to achieve the aforementioned object, in the present invention, metal particulate is dispersed at at least part of a data mark of a recording medium for recording and reproducing information utilizing mutual interaction due to near field light generated by light incident to an optical head. Alternatively, metal particulate is dispersed at at least part of a data mark of a recording medium for recording and reproducing information utilizing mutual interaction due to near field light generated by light irradiating a recording medium. In other words, a layer dispersed with metal particulate taken as a date mark may be provided. Describing a specific structure in detail, a pattern of a light-blocking layer is formed on a transparent substrate, and a layer dispersed with metal particulate is formed on the transparent substrate at locations where the light-blocking layer is not provided.

According to this structure, the dispersed metal particulate receives energy during mutual interaction of incident light with the data mark of a size equal to or less than the wavelength of the incident light, and this energy is converted back to being light at a lower or upper part of the data mark, so that an output signal is amplified, an S/N ratio is improved and head scanning speed can be increased.

Alternatively, the dispersed metal particulate receives energy during mutual interaction of irradiating light passing through the data mark of a size equal to or less than the wavelength of the incident light, this energy is convened back to being light at a lower or upper part of the data mark, so that an output signal is amplified, an S/N ratio is improved and head scanning speed can be increased. The near field optical head therefore does not have to be irradiated with light of a substantial intensity and thermal damage to the head can be prevented.

Further, a material capable of generating a surface plasma as a result of light being incident to (or light irradiating) the metal particulate is employed.

According to this structure, energy due to incident light (or irradiating light) is received by a plasmon as a result of excitation of a plasmon at the surface of the metal particulate and this surface plasmon is then again converted into optical energy. As a result, the intensity of a signal generated by mutual interaction with a microscopic data mark smaller than the wavelength of incident light (or the wavelength of irradiating light) can be amplified, the S/N ratio can be improved, and the data transmission speed can be increased.

Further, the metal particulate can include at least one metal of Ag, Au, Cr, Al or Cu. A particle diameter of the metal particulate is from 1 nanometer to 50 nanometers, and a wavelength of the incident light or irradiating light is between 300 nanometers and 1 $\mu$m.

Accordingly, a standard laser light source can be utilized for the incident light or irradiating light, and the metal particulate material can also be cheap. This means that mass production is possible at lower manufacturing costs.

The method for manufacturing a recording medium of the above structure comprises the steps of patterning a light-blocking layer on a transparent substrate, and forming a layer dispersed with metal particulate at locations where the light-blocking layer of the transparent substrate is not provided.

According to this invention, a highly efficient near field optical head can be manufactured with just a slight change in the manufacturing steps so that manufacture of a low-cost near field optical head is possible.

Further, there is provided a near field optical head for recording and reproducing information utilizing mutual interaction due to near field light generated by light incident to the near field optical head comprising a conical light-passing section formed at the substrate; an optical opening smaller than the wavelength of incident light formed at an end of the light-passing section; and a layer dispersed with metal particulate provided at at least part of the optical opening.

According to this structure, a near field optical head for recording and reproducing high-density information utilizing a related magnetic disc device configuration can be implemented. Further, because the optical efficiency of the near field optical head is high, an output signal of a sufficient intensity can be obtained without increasing the intensity of the incident light and a head where damage due to heating by the incident light can be avoided is realized. Further, the high optical efficiency brings about a high S/N ratio, and the data transmission speed can also be increased.

Further, there is provided a near field optical head for recording and reproducing information utilizing mutual interaction due to near field light generated by light incident to the near field optical head comprising a conical light-passing section formed at the substrate; an optical opening smaller than the wavelength of incident light formed at an end of the light-passing section; and a layer dispersed with metal particulate provided at least part of the optical opening.

According to this structure, a near field optical head for recording and reproducing high-density information utilizing a related magnetic disc device configuration can be implemented. Further, because the optical efficiency of the near field optical head is high, an output signal of a sufficient intensity can be obtained without increasing the intensity of the irradiating light and a head where damage due to heating by the irradiating light is avoided can be realized. Moreover, the high optical efficiency brings about a high S/N ratio, and the data transmission speed can also be increased.

Still further, a near field optical head for recording and reproducing information utilizing mutual interaction due to near field light generated by light incident to the near field optical head is formed with an optical opening smaller than or equal to the wavelength of light incident to the tip of a pointed light propagating body, with metal particulate being dispersed at part of the optical opening.

According to this structure, a near field head of a high optical efficiency can be made using a simple method, and a high data transmission speed can be implemented as a result of the high optical efficiency.

Further, in the present invention, there is provided an optical recording device for recording and reproducing information utilizing mutual interaction of near field light generated by light irradiating a recording medium and a near field optical head, wherein the near field optical head is equipped with a light-propagating body formed at an optical opening smaller than a wavelength of the irradiating light at a tip thereof, and a metal particulate is dispersed at the optical opening.

According to this structure, a near field head of a high optical efficiency can be made using a simple method, and a high data transmission speed can be implemented as a result of the high optical efficiency.

Further, the metal particulate is made of a material capable of generating a surface plasma as a result of the incidence or the irradiation of light.

Accordingly, energy of incident light or irradiating light is converted to energy of a surface plasmon of the metal particulate and propagated to a microscopic space in the shape of the plasmon so that energy can be propagated to the head in a highly efficient manner. As a result, a near field optical head of a high optical efficiency can be made and a high data transmission speed can be achieved.

Further, a method for manufacturing a near field optical head of the present invention comprises the steps of forming a conical hole in a substrate; forming a light blocking film at a side surface of the hole; and forming a layer dispersed with metal particulate in the vicinity of the opening.

According to this invention, a highly efficient near field optical head can be manufactured with just a slight change in the manufacturing steps.

Further, a further method for manufacturing a near field optical head of the present invention comprises the steps of: forming a tip part at a light propagating body; forming a light blocking film at the light propagating body with the exception of the tip part; and dispersing metal particulate at the tip part.

According to this invention, a highly efficient near field optical head can be manufactured with just a slight change in the manufacturing steps.

DETAILED DESCRIPTION OF THE PREFERRED EMBODIMENTS (First Embodiment)

Figure 1:
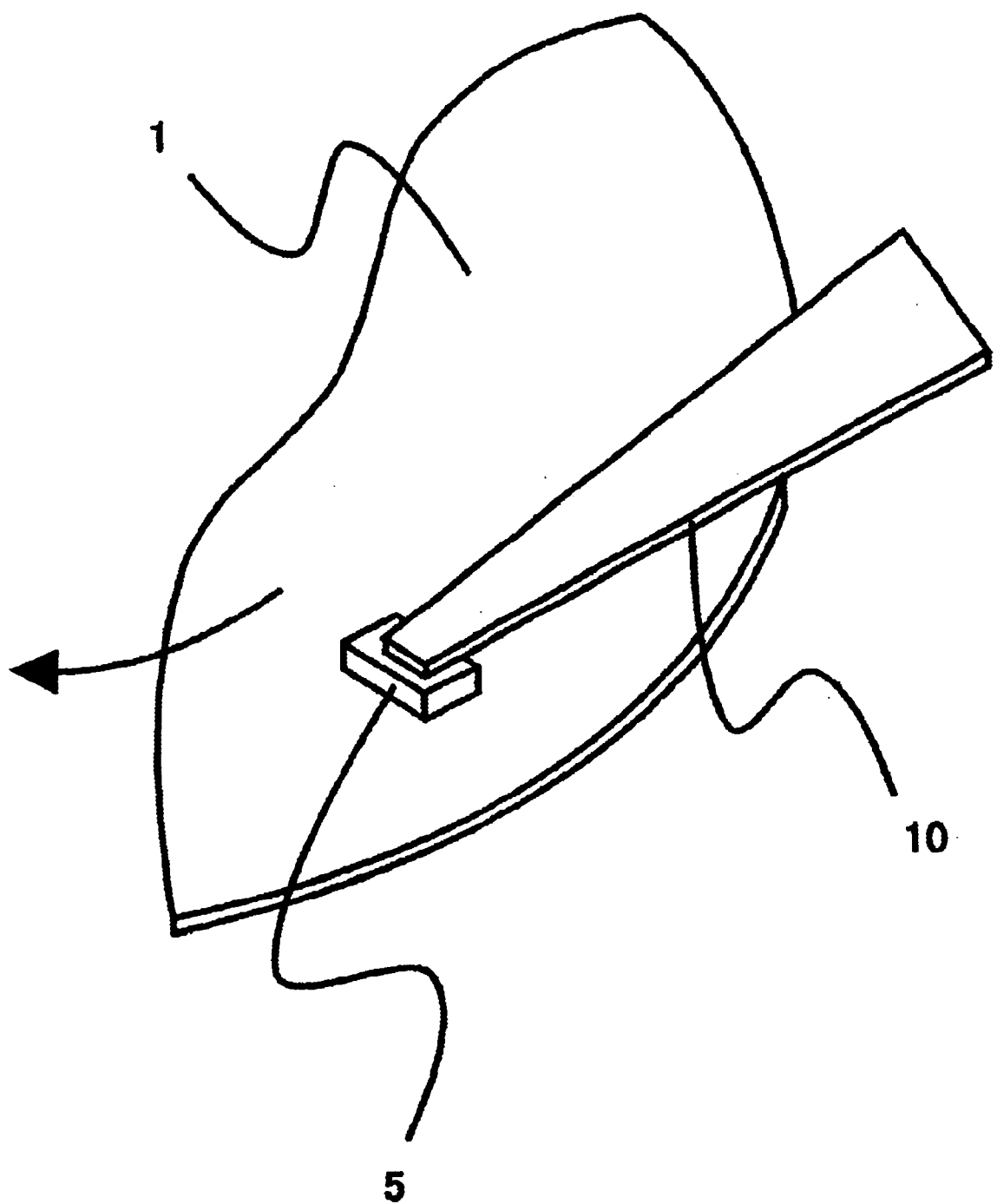
FIG. 1 is a schematic view of an optical information recording/reproduction device employing a flying head.
Figure 2:
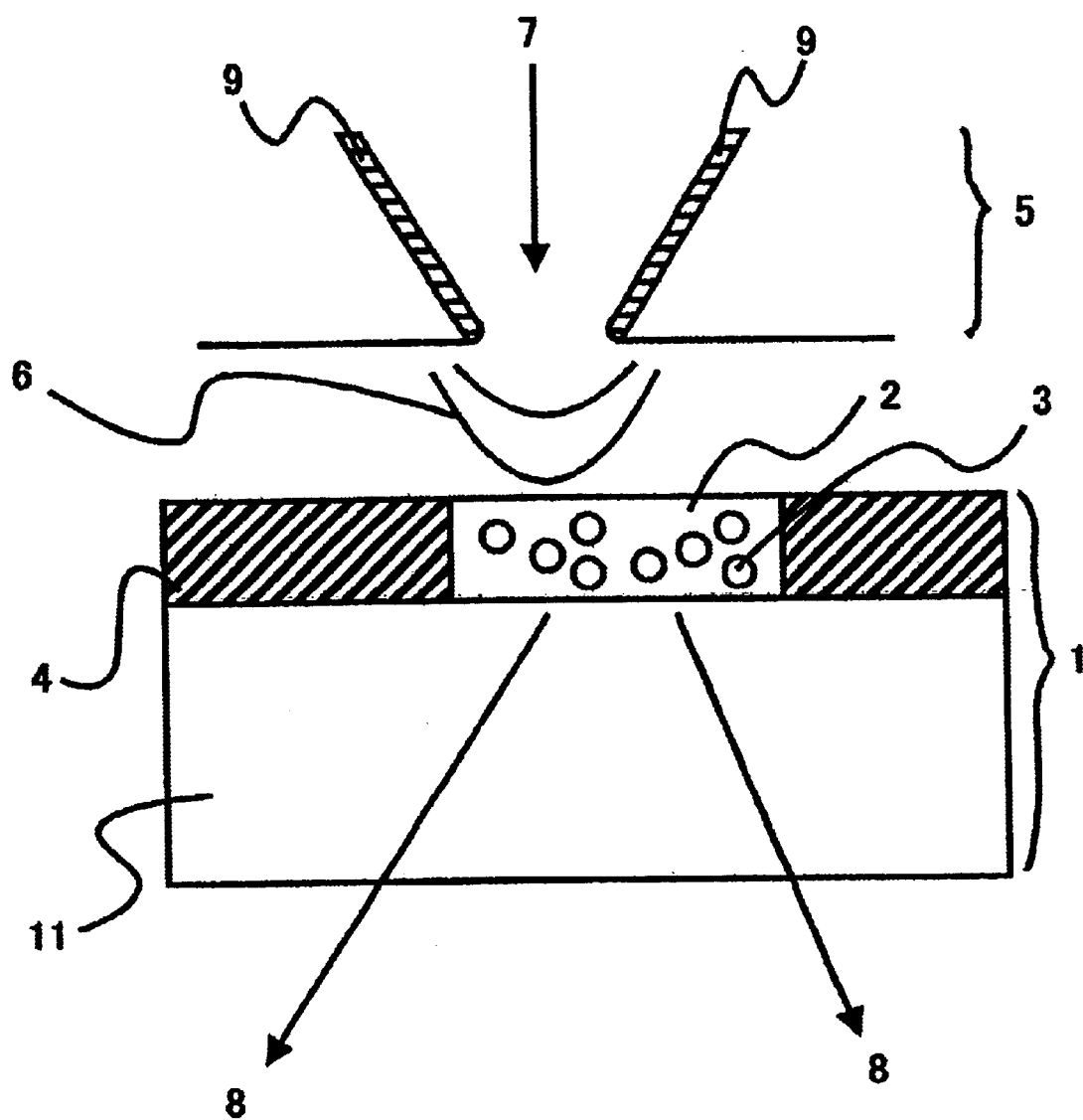
FIG. 2 is a cross-sectional view of a near field light recording medium and a near field optical head of a first embodiment of the present invention.

A cross-sectional view of a near field light recording medium 1 and a near field optical head 5 of the present invention is shown in FIG. 2. A light-blocking layer 4 is patterned on the transparent substrate 11, the data mark arrangement layer (hereinafter referred to as "data mark") 2 is formed, and a metal particulate 3 is then dispersed at this data mark 2. The metal particulate 3 can also be a metal particulate with a metal layer provided at a surface of the metal particulate. The data mark 2 allows light to pass and can be formed of a layer capable of maintaining a metal particulate. Specifically, the data mark 2 is a rectangular $SiO_2$ layer 50 nanometers across and 40 nanometers in length.

As shown in the drawings, an cone-shaped space is formed at a silicon substrate constituting the near field optical head 5. This cone-shaped space is made by anisotropic etching of the silicon substrate. A circular microscopic opening of a diameter of 50 nanometers is provided at an end of the cone-shaped space. A light-blocking film 9 is provided at a silicon substrate formed with a space in the shape of an inverted cone in the vicinity of this microscopic opening. Incident light 7 incident from above the near field optical head 5 causes near field light 6 to be generated, with this near field light 6 mutually acting on the data mark 2 of the recording medium 1. Dispersed light 8 generated as a result of this mutual interaction passes through the transparent substrate 11, is detected by a detection element (not shown) and is processed as an output signal.

Here, an Ag particulate is employed as the metal particulate 3, an Al film is employed as the light-blocking layer 4, and a glass substrate is employed as the transparent substrate 11. The Ag particulate has an average particle diameter of 6 nanometers and is dispersed within the $SiO_2$ layer. This structure is made using the method described in the following.

First, an Al film is vacuum-deposited onto a polished surface of the glass substrate and a pattern is formed by wet etching. The Al film is formed to an average thickness of approximately 20 nanometers. Next, $SiO_2$ of a diameter of approximately 10 cm is taken as a target, a square layer of Ag (with sides of 2 mm) is placed on the target, and $SiO_2$ and Ag are then simultaneously sputtered onto the substrate by cosputtering of Ar. Here, the concentration of Ag within the $SiO_2$ is approximately five percent according to density measurements, but this can be controlled by adjusting the shape of the sputtering target and the thickness of the Ag layer. Finally, the $SiO_2$ layer is polished and flattened until the Al film appears at the upper surface.

When the recording medium 1 is canned by the near field optical head 5, near field light 6 emitted from the near field optical head 5 temporarily excites surface plasma (hereinafter referred to as "plasmon" of the Ag particulate so as to propagate energy to the surface plasmon. This surface plasmon is scattered at the lower surface of the data mark 2 so as to be propagated as scattered light 8 and sensed as an output signal.

The incident light 7 is usually severely attenuated when passing through the microscopic opening of the near field optical head 5 but strong coupling is activated due to the presence of the Ag particulate in the vicinity of the microscopic opening and light of an intensity of a few tens to a few hundreds of times the intensity when an Ag particulate is not present therefore passes through the data mark 2. Although a detailed theory of this mechanism is not made clear, experimental and theoretical calculations with regards to increasing the intensity of near field light via a plasmon are disclosed in Physical Review B; 55 (7), 4774 (1997) by T. Kume, S. Hayashi, and K. Yamamoto. Further, in an article in Nature, 391 (12), 667 (1998), by T. W. Ebbesen, H. J. Lezec, H. F. Ghaemi, T. Thio, and P. A. Wolff, it is disclosed that abnormally high transmittance is achieved with light passing through a microcscopic opening made in a metal film. In the latter, a microscopic opening is periodically created in a metal film but in a later publication in J. Opt. Soc. Am. B., 16 (10), 1743 (1999), by T. Thio, H. F. Ghaemi, H. J. Lezec, P. A. Wolff, and T. W. Ebbesen, it is disclosed that a similar increase in intensity can be attained with a single microscopic opening, with an optical energy propagation mechanism due to a plasmon and a description of this mechanism is provided therein. In this embodiment, an increase in signal strength is confirmed due to the Ag particulate being scattered within the data mark 2.

In this embodiment, the intensity of outputted light with respect to the intensity of the incident light is increased by employing the recording medium 1 having this structure, and the S/N ratio of the output signal can therefore be increased. Further, the Ag particulate is scattered within the $SiO_2$ layer and is therefore not exposed to air so that oxidation of the Ag is prevented.

(Second Embodiment)

Figure 3:
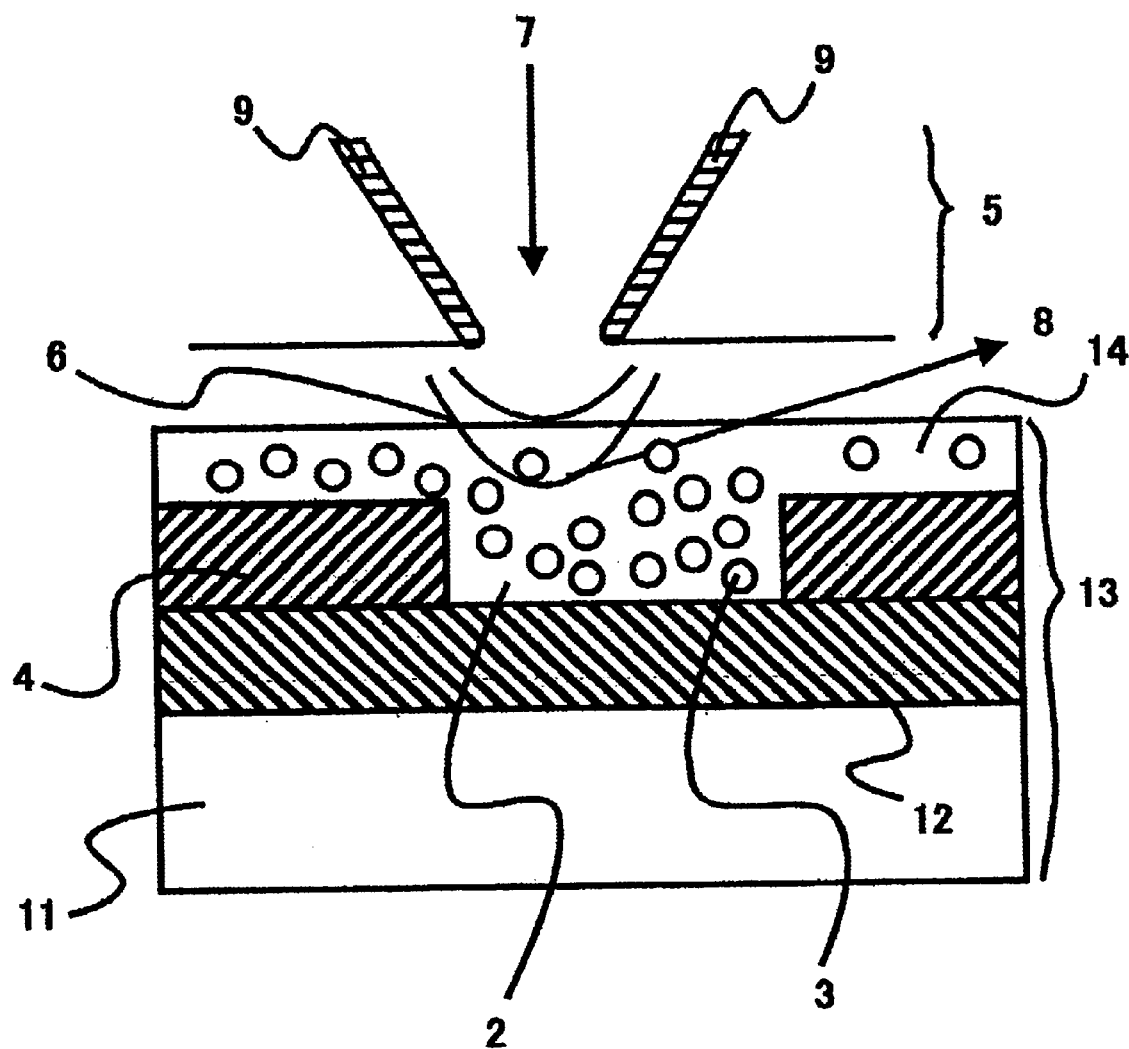
FIG. 3 is a cross-sectional view of a near field light recording medium and a near field optical head of a second embodiment of the present invention.

A cross-sectional view of a near field light recording medium 13 and a near field optical head 5 of a second embodiment of the present invention is shown in FIG. 3, with portions that are the same as portions in FIG. 2 being given the same numerals. The distinctions from the first embodiment are that a reflecting film 12 is formed between the transparent substrate 11 and the light-blocking layer 4, and that the layer 14 where the metal particulate 3 is scattered is not just formed on the data mark, but is also formed on the light-blocking layer 4. Scattered light 8 generated by mutual interaction of the near field light 6 and the data mark 2 is then detected as reflected light. A detection element (not shown) can then be located, for example, at the lower surface of the near field optical head 5 so as to give the overall device a compact configuration. In this embodiment, the layer 14 in which the metal particulate 3 is scattered is formed on the light-blocking layer 4 but can easily also be made to be present only on the data mark 2 as in the first embodiment by polishing the upper surface.

It is possible to control the size of the metal particulate 3 by controlling the amount of movement of the Ar ions at the time of the aforementioned cosputtering. Further, the metal particulate 3, for example, can be drawn to within the data mark by near field light nanomanipulation by exposure to light from the bottom of the transparent substrate 11. Namely, the metal particulate is scattered at a low concentration in As of a particle diameter of 30 nanometers, so that a single particulate can be made to exist within the data mark 2.

Here, Ag is used as the metal particulate but this is by no means limited to Ag, and the same results can be achieved by adjusting the wavelength of the incident light even if, for example, Au, Cr, Al or Cu is employed.

(Third Embodiment)

Figure 4:
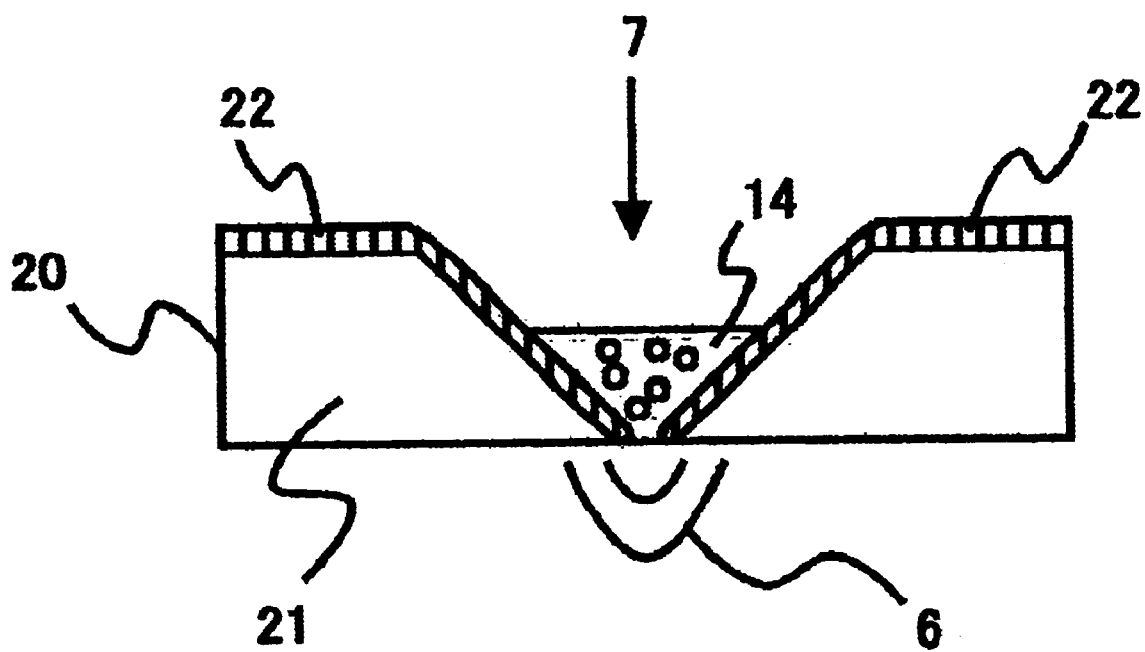
FIG. 4 is a cross-sectional view of a near field optical head of a third embodiment of the present invention.

A cross-sectional view of a near field optical head 20 of a third embodiment of the present invention is shown in FIG. 4. A cone-shaped space is made in a silicon substrate 21 of a thickness of 400 $\mu$m and a light-blocking film 22 is formed on the surface. Further, an opening smaller than the wavelength of the incident light is formed at a tip of the cone-shaped space. An SiO$_2$ layer 14 within which Ag particulate is scattered is formed in the vicinity of the tip of the cone-shaped space (0.5 $\mu$m from the lower surface). Incident light 7 is propagated from a waveguide (not shown) so that near field light 6 is generated at the lower surface of the head. With optical recording devices employing near field optical heads, the near field optical head floats from the surface of the recording medium as a result of floating force generated by relative motion of the silicon substrate 21 and the surface of the recording medium (not shown).

This kind of structure is manufactured in the following manner.

First, a reversed cone-shaped hole is formed in a silicon wafer by anisotropic etching. Next, a light-blocking film 22 (an Al film in this embodiment) is vapor-deposited to a thickness of approximately 100 nanometers. Next, Ag and SiO$_2$ are simultaneously sputtered from below using the cosputtering methods described for the first embodiment so as to form an SiO$_2$ layer dispersed with Ag particulate. This Ag—SiO$_2$ layer encroaches to within from the aforementioned cone-shaped tip so that a layer shape is formed in the vicinity of the opening. Finally, surplus parts of the layer are removed by polishing until the silicon appears from below. In this embodiment, cosputtering is carried out from below but this can also be carried out from above.

When the incident light 7 enters the cut-off region, this incident light 7 is usually rapidly attenuated, but with the structure of this embodiment, the incident light 7 couples with the surface plasmon of the particulate. The surface plasmon converts the energy of the incident light 7 to plasmon energy and converts light from the lower surface of the near field optical head 20 and light with an increased intensity of a few tens to a few hundreds of times of that of the related t can therefore be obtained.

An even more striking improvement in optical efficiency can be achieved by combining the recording medium of the first and second embodiments with the head of this embodiment. An increase in optical efficiency also brings about improvement in the S/N ratio, an increase in the data transmission rate, a reduction in head heat loss and a reduction in power consumed.

(Fourth Embodiment)

Figure 5:
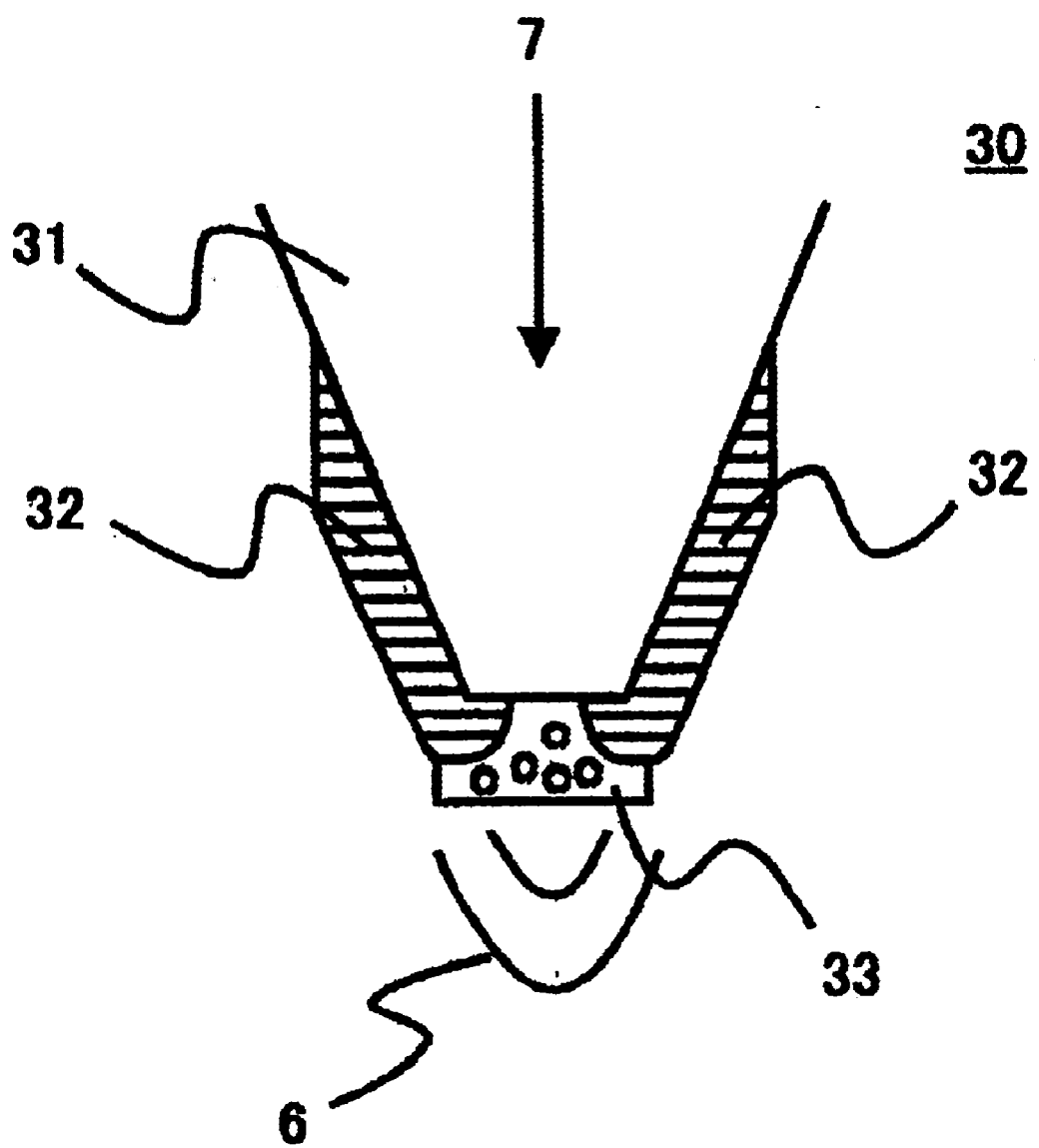
FIG. 5 is a cross-sectional view of a near field optical head of a fourth embodiment of the present invention.

A cross-sectional view of a near field optical head 30 of a fourth embodiment of the present invention is shown in FIG. 5. A light-blocking film 32 (in this embodiment, an Al film) is formed at the tip of a pointed optical fiber 31 everywhere except at the tip itself. The tip is coated with a layer 33 dispersed with a metal particulate (in this embodiment, a SiO$_2$ layer dispersed with an Ag particulate).

A near field optical head of this structure is manufactured in the following manner.

First, an optical fiber is cut by heating and stretching. Next, Al is vapor deposited with the optical fiber held at an angle and the light-blocking film 32 is formed except at the tip portion. After this, a SiO$_2$ layer dispersed with Ag particulate is formed at the tip portion using the cosputtering described in the first embodiment.

Alternatively, a near field head of the aforementioned structure can be made by forming a conical projection by etching a transparent substrate such as a glass substrate etc., and then forming a light-blocking film everywhere except for the tip of this projection.

With a near field optical head 30 made in this manner, energy of incident light is converted to energy of a particulate plasmon, and passes through a microscopic region. This gives an optical efficiency of a few tens to a few hundreds of times greater than when a SiO$_2$ layer with no dispersed Ag particulate is provided.

As a result, a signal of the required intensity can be obtained without raising the intensity of the incident light and thermal damage to a head tip due to excessive incident light can be avoided. Further, a still greater improvement in efficiency can be achieved by combining this embodiment with the recording medium of the first embodiment.

In this embodiment an optical fiber is employed as a light propagating body but the same results can also be achieved using other light propagating bodies such as the processing of an optical waveguide into a cantilever shape.

(Fifth Embodiment)

Figure 6:
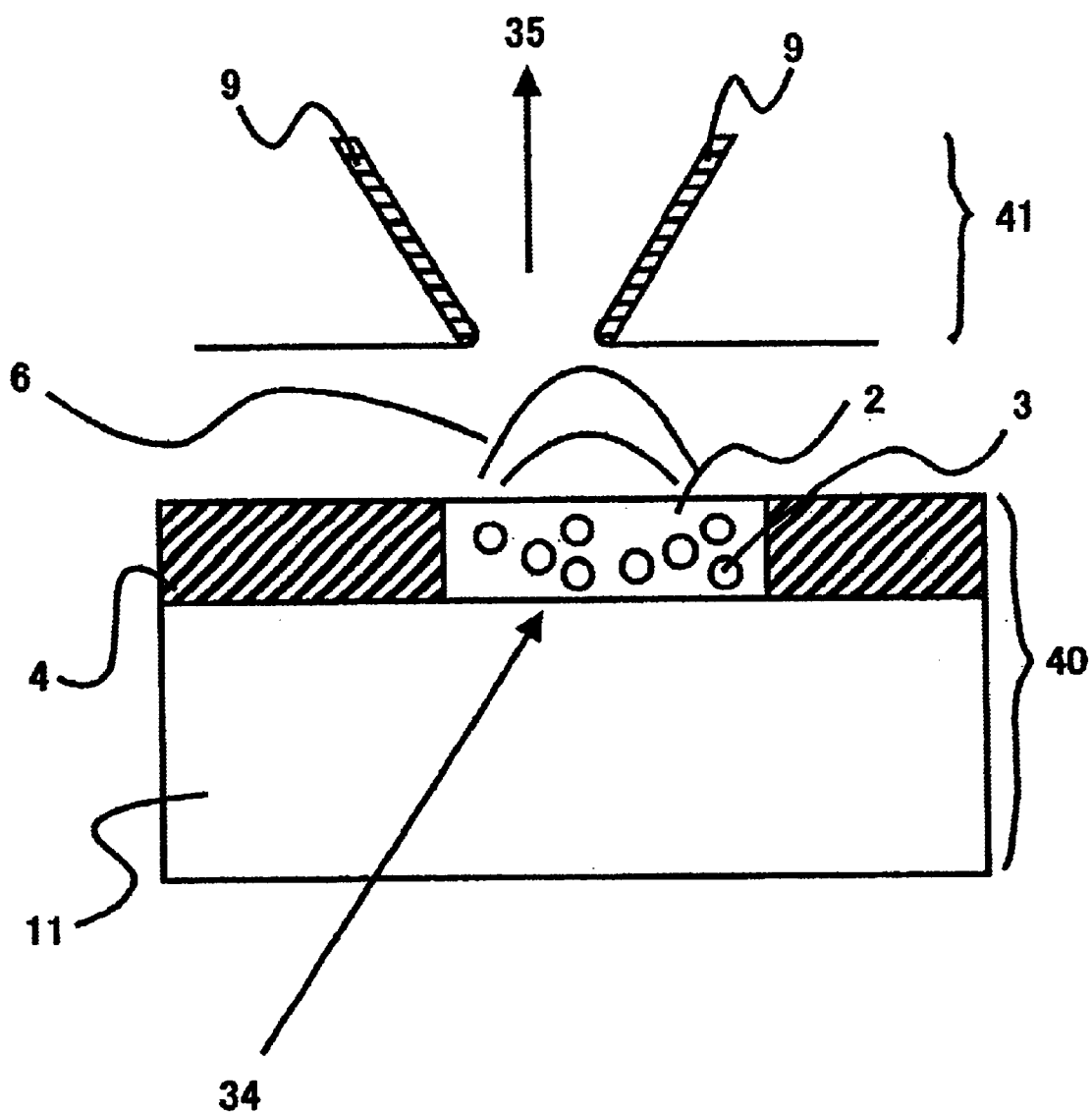
FIG. 6 is a cross-sectional view of a near field optical head of a fifth embodiment of the present invention.

A cross-sectional view of a near field optical head 41 and recording medium 40 of a fifth embodiment of the present invention is shown in FIG. 6. This basic configuration is substantially the same as for the first embodiment and a detailed description thereof is therefore omitted. However, the point of distinction with the first embodiment is that light irradiates downwards from the recording medium. Irradiating light 34 uses mutual interaction with the data mark 2 to generate near field light 6. This near field light 6 is then converted to detection output light 35 by the near field optical head 41 for detection by a detection element (not shown). Because the data mark is microscopic compared to the wavelength of the irradiating light 34, near field light 6 of a sufficient intensity is not normally generated. In this embodiment, because Ag particulate (i.e. particulate 3) is dispersed within the data mark 2, energy of the irradiating light 34 is converted to energy of a surface plasmon of an Ag particulate and then converted into the near field light 6 so that near field light of an intensity of a few tens to a few hundred times more than normal is generated. As a result, data can be accessed with a high S/N ratio and a high transmission speed can therefore be achieved.

It is not essential to generate near field light from the head side in order to implement the present invention. For example, the structure of the fifth embodiment can also be implemented for the third embodiment or fourth embodiment. It is therefore no longer necessary to irradiate the head with strong light by irradiating the recording medium with light and focussing the generated near field light onto the head, and damage to the head due to heating can therefore be avoided.

(Sixth Embodiment)

Figure 7:
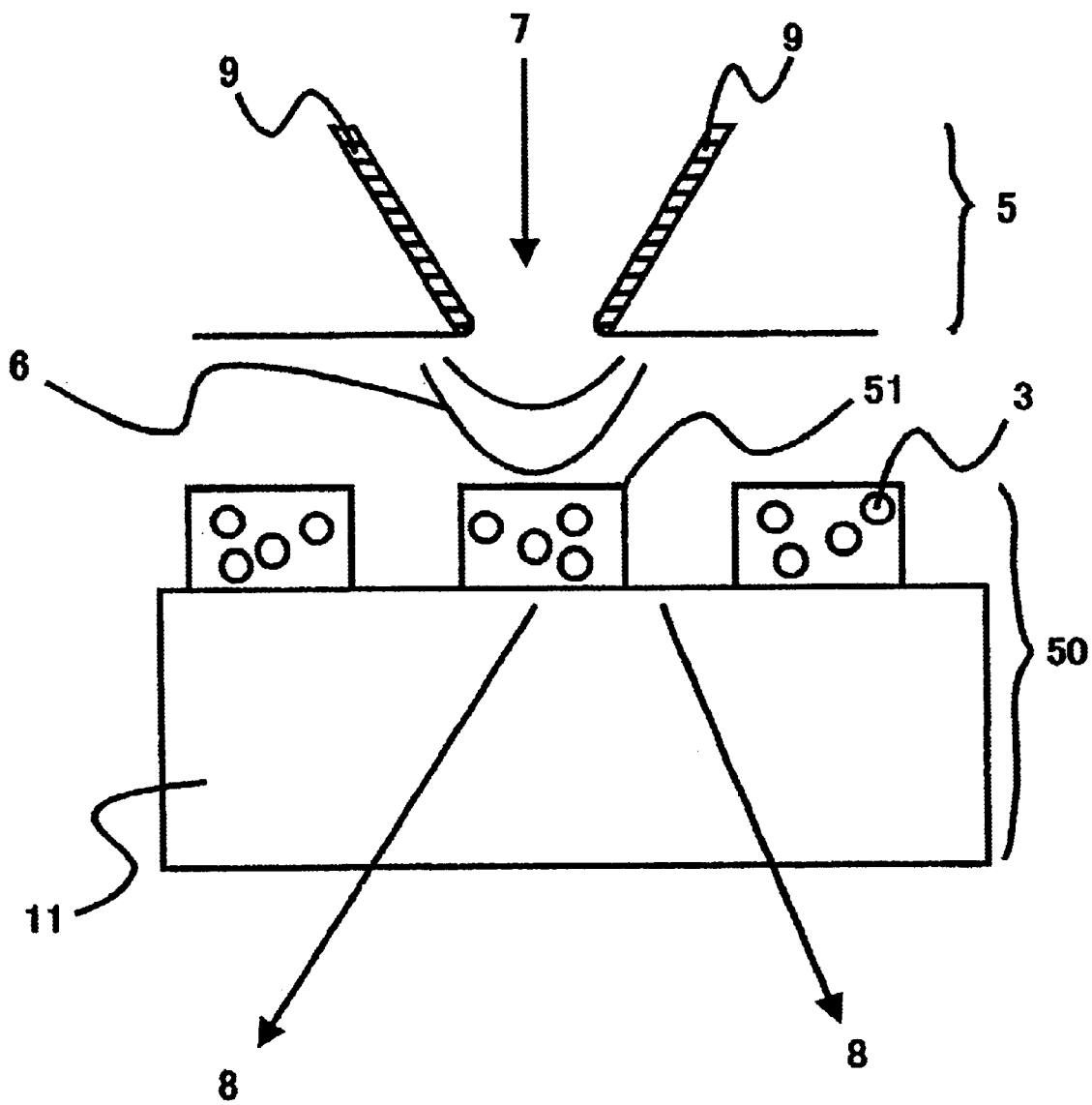
FIG. 7 is a cross-sectional view of a near field optical head of a sixth embodiment of the present invention.

FIG. 7 shows a cross-sectional view of a near field optical head 5 and recording medium 50 of a sixth embodiment of the present invention. The recording medium 50 has a data mark 51 patterned on the glass substrate 11. The data mark 51 consists of a layer of $SiO_2$ dispersed with Ag particulate (i.e. the metal particulate 3). This manufacturing method employs the same cosputtering as the first embodiment.

When the near field optical head 5 scans the surface of the recording medium 50, energy of the near field light 6 couples with the surface plasmon of the Ag particulate 3 within the data mark so that scattered light 8 is generated, is detected by a detection element (not shown) below the recording medium 11 and is taken as an output signal. As a result, when comparing with the output signal for when the near field optical head 5 is present on portions where there is no data mark, the output signal for when the near field optical head 5 is present on the data mark 51 is extremely high, and a high contrast signal is obtained.

Figure 8:
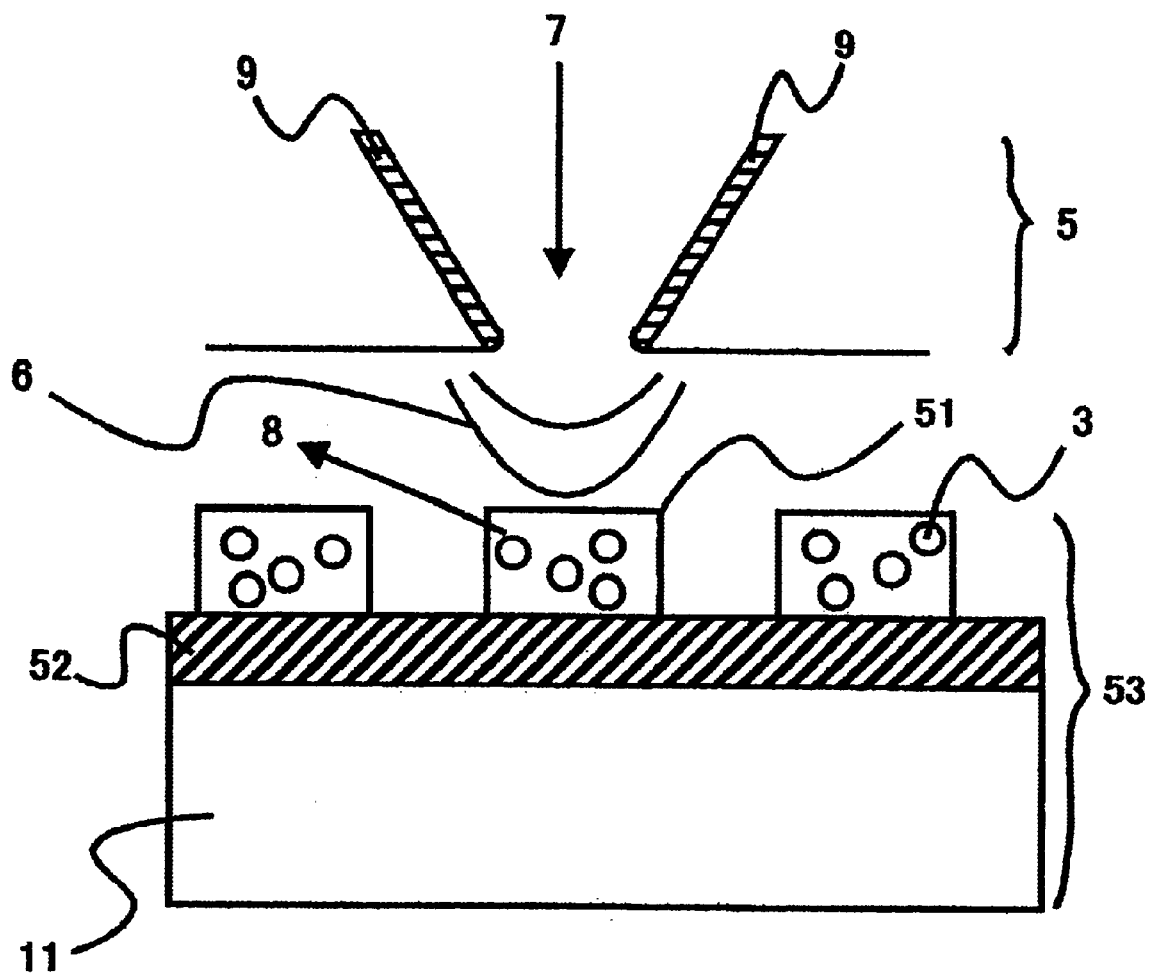
FIG. 8 is a cross-sectional view of a near field optical head of a sixth embodiment of the present invention.

The same embodiment is also shown in FIG. 8. As shown in FIG. 8, a reflecting film 52 (in this embodiment, and Al film) is formed at the recording medium 53, with a data mark 51 being patterned on the reflecting film 52. With this configuration, the scattered light 8 generated as a result of mutual interaction between the near field light 6 and the data mark 51 is propagated to above the recording medium. The detection element (not shown) can then, for example, be fitted to or formed at the lower surface of the near field optical head 5 and the entire device can therefore be made smaller as a result.

(Seventh Embodiment)

Figure 9:
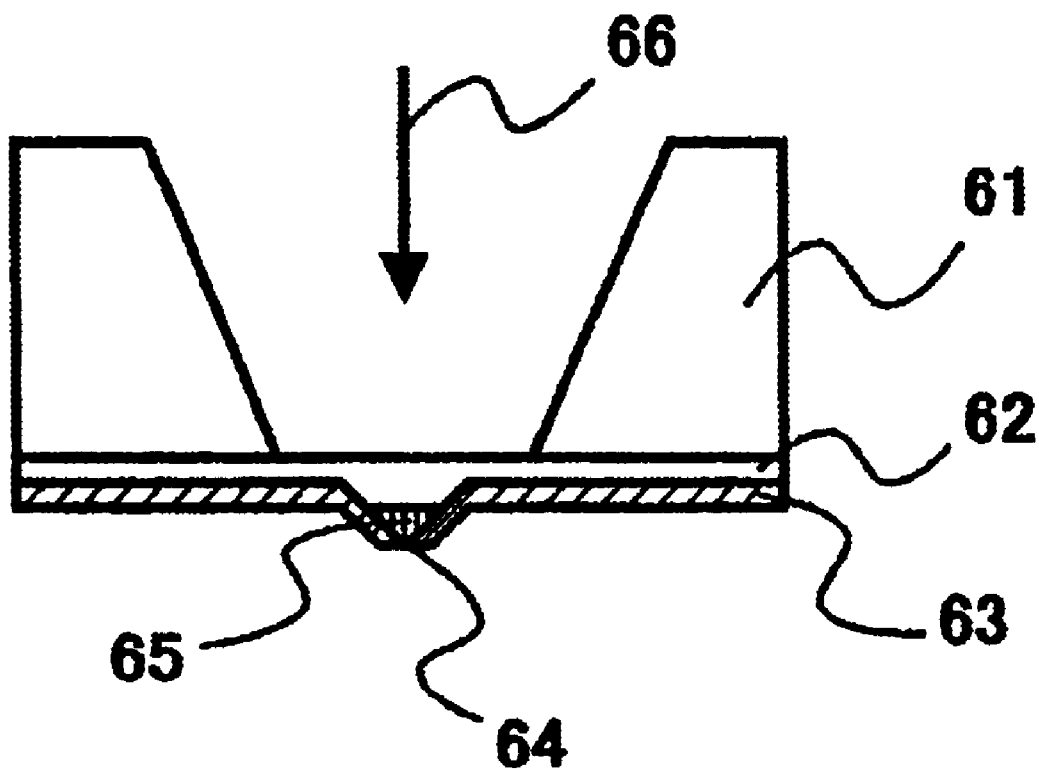
FIG. 9 is an outline view of a near field optical head of a seventh embodiment of the present invention.

FIG. 9 is an outline view showing a cross-section of a near field optical head 60 of a seventh embodiment of the present invention. The near field optical head 60 comprises an Si substrate 61, an $SiO_2$ layer 62 built onto the bottom surface of the Si substrate 61, an $SiO_2$ layer 65 including Ag particulate, and a light-blocking film 63. The Si substrate 61 is partially removed from above by anisotropic etching so as to allow incident light 66 to pass. The Si substrate 61 is a few tens to a few hundreds of $\mu$m thick, and although this is not shown in the drawings, also has lateral and horizontal dimensions of a few tens to a few hundreds of $\mu$m. The $SiO_2$ layer 62 is a thickness of 10 $\mu$m or less in order to allow incident light to pass but can be made thicker than this. A conical projection is then formed in this $SiO_2$ layer 62 using isotropic etching such as photolighography. The $SiO_2$ layer 65 dispersed with Ag particulate (i.e. metal particulate) is then deposited thereon. The light-blocking film 63 is then deposited, a tip is cut using an FIB (Focused Ion Beam) etc., and a microscopic opening 64 is made. The cutting of the tip is by no means limited to an FIB, and a simple method where after forming a countersink having substantially the same height as the projection about the periphery of the conical projection, a plate is mounted on top and then hit with a hammer can also be implemented. The Ag particulate included in the $SiO_2$ layer 65 has a particle diameter of a few to a few tens of nm. With the near field optical head 60 made in this manner, light is amplified due to a plasmon effect generated at the surface of the Ag particulate included in the $SiO_2$ layer 65, and an output signal of an intensity of a few to a few hundreds of times that of a related near field optical head can be obtained. This means that the data transmission speed can also be increased.

As described above, metal particulate is dispersed at least part of a data mark of a recording medium for recording and reproducing information utilizing mutual interaction due to near field light generated by light incident to an optical head. As a result, the dispersed metal particulate receives energy during mutual interaction of incident light with the data mark of a size equal to or less than the wavelength of the incident light, this energy is converted back to being light at a lower or upper part of the data mark. The output signal is amplified, the S/N ratio is improved, and the head scanning speed can be increased.

Further, metal particulate is dispersed at least part of a data mark of a recording medium for recording and reproducing information utilizing mutual interaction due to near field light generated by light irradiating a recording medium. As a result, the dispersed metal particulate receives energy during the passing of irradiating light through the data mark of a size equal to or less than the wavelength of the incident light and this energy is converted back to being light at an upper part of the data mark. As a result, the output signal is amplified, the S/N ratio is improved, and the head scanning speed can be increased. Further, the output signal is amplified, the S/N ratio is improved, and the head scanning speed can be increased.

Moreover, a near field optical head for recording and reproducing information utilizing mutual interaction due to near field light generated by light incident to the near field optical head has a conical light-passing section at a substrate and is formed with an optical opening smaller than or equal to the wavelength of light incident to the tip of the light-passing section, with metal particulate being dispersed at least part of the optical opening. As a result, a near field optical head for recording and reproducing high-density information utilizing a related magnetic disc device configuration can be implemented. Further, because the optical efficiency of the near field optical head is high, an output signal of a sufficient intensity can be obtained without increasing the intensity of the incident light and a head where damage due to heating by the incident light can be realized. As a result, the output signal is amplified, the S/N ratio is improved, and the head scanning speed can be increased.

Further, in the present invention, there is provided an optical recording device for recording and reproducing information utilizing mutual interaction of near field light generated by light irradiating a recording medium and a near field optical head, wherein a conical light-passing section is formed in the substrate constituting the near field optical head, an opening smaller than the wavelength of the irradiating light is formed at a tip of the light-passing section, and a metal particulate is dispersed at least the optical opening. As a result, a near field optical head for recording and reproducing high-density information utilizing a related magnetic disc device configuration can be implemented. Further, because the optical efficiency of the near field optical head is high, an output signal of a sufficient intensity can be obtained without increasing the intensity of the irradiating light and a head where damage due to heating by the irradiating light can be realized. As a result, the output signal is amplified, the S/N ratio is improved, and the head scanning speed can be increased.

Further, a near field optical head for recording and reproducing information utilizing mutual interaction due to near field light generated by light incident to the near field optical head is formed with an optical opening formed so as to be smaller than or equal to the wavelength of light incident to the tip of a pointed light propagating body, with metal particulate being dispersed at least one part within the optical opening. As a result, a near field head of a high optical efficiency can be made using a simple method, and a high data transmission speed can be implemented as a result of the high optical efficiency.

Further, there is provided a near field optical head for recording and reproducing information utilizing mutual interaction due to near field light generated by light irradiated onto the near field optical head and the near field optical head is formed with an optical opening formed so as to be smaller than or equal to the wavelength of the irradiating light incident to the tip of a pointed light propagating body, with metal particulate being dispersed at least part of the optical opening. In this way, a near field head of a high optical efficiency can be made using a simple method, and a high data transmission speed can be implemented as a result of the high optical efficiency.

The present invention proposes a method for manufacturing a near field optical head, comprising the steps of: forming a conical hole in a silicon substrate; forming a light blocking film at a side surface of the bole; and forming a film dispersed with metal particulate in the vicinity of an opening of the hole, or alternatively, a further method for manufacturing a near field optical head of the present invention comprises the steps of: forming a tip part at a light propagating body; forming a light blocking film at the light propagating body with the exception of the tip part; and dispersing metal particulate at the tip part. A near field optical head of a high optical efficiency can therefore be manufactured by just making slight changes to the manufacturing process.

What is claimed is:

1. A recording medium for recording and reproducing information utilizing near field light generated by light incident to an optical head or light irradiated onto the recording medium, the recording medium comprising: a transparent substrate; a data mark arrangement layer disposed over less than an entire surface of the transparent substrate; and a metal particulate dispersed only in the data mark arrangement layer so that a surface plasma is generated upon interaction of the data mark arrangement layer with near field light generated by incident light or irradiating light for amplifying the intensity of scattered light generated as a result of the interaction between the data mark arrangement layer and the near field light.

2. A recording medium according to claim 1; wherein the metal particulate dispersed in the data mark arrangement layer comprises at least one metal selected from the group consisting of Ag, Au, Cr, Al and Cu.

3. A recording medium according to claim 1; wherein a particle diameter of the metal particulate dispersed in the data mark arrangement layer is in a range of 1 nanometer to 50 nanometers; and wherein a wavelength of incident light or irradiating light for generating the near field light is in a range of 300 nanometers to 1 µm.

4. A recording medium according to claim 1; further comprising a light-blocking layer disposed on the surface of the transparent substrate and surrounding the data mark arrangement layer.

5. A recording medium according to claim 1; further comprising a light-blocking layer containing the data mark arrangement layer and disposed over the surface of the transparent substrate, and a light reflecting layer disposed between the surface of the transparent substrate and the light-blocking layer.

6. A recording medium according to claim 1; further comprising a light reflecting layer disposed between the surface of the transparent substrate and the data mark arrangement layer.

7. An optical recording device comprising: a near field optical head having a semiconductor substrate and a conical light-passing section formed in the semiconductor substrate and having an optical opening at an apex thereof; and a recording medium having a transparent substrate, a data mark arrangement layer disposed over less than an entire surface of the transparent substrate, and a metal particulate dispersed only in the data mark arrangement layer for interacting with near field light generated by incident light passing through the optical opening of the conical light-passing section to disperse light through the transparent substrate and for generating a surface plasma upon interaction with the near field light for amplifying the intensity of the dispersed light.

8. An optical recording device according to claim 7; wherein the dispersed metal particulate comprises at least one metal selected from the group consisting of Ag, Au, Cr, Al and Cu.

9. An optical recording device according to claim 7; further comprising a light-blocking layer disposed on the surface of the transparent substrate and surrounding the data mark arrangement layer.

10. An optical recording device according to claim 7; further comprising a light-blocking layer disposed over the surface of the transparent substrate; and wherein the data mark arrangement layer is disposed over the light-blocking layer.

11. A recording medium according to claim 7; further comprising a light reflecting layer disposed between the surface of the transparent substrate and the data mark reflecting layer.

12. An optical recording device comprising: a recording medium having a transparent substrate, a data mark arrangement layer disposed over less than an entire surface of the transparent substrate, and a metal particulate dispersed only in the data mark arrangement layer for interacting with near field light generated by irradiating light and for generating a surface plasma upon interaction with the near field light; and a near field optical head having a semiconductor substrate and a conical light-passing section for converting near field light generated by the interaction between the irradiating light and the dispersed metal particulate to a detection output light.

13. An optical recording device according to claim 12; wherein the dispersed metal particulate comprises at least one metal selected from the group consisting of Ag, Au, Cr, Al and Cu.

14. An optical recording device according to claim 12; further comprising a light-blocking layer disposed on the surface of the transparent substrate and surrounding the data mark arrangement layer.

15. An optical recording device according to claim 12; further comprising a light-blocking layer disposed over the surface of the transparent substrate; and wherein the data mark arrangement layer is disposed over the light-blocking layer.

16. A recording medium according to claim 12; further comprising a light reflecting layer disposed between the surface of the transparent substrate and the data mark arrangement layer.

17. A recording medium for recording and reproducing information utilizing near field light generated by light incident to an optical head or light irradiated onto the recording medium, the recording medium comprising: a transparent substrate; a data mark arrangement layer containing a dispersed metal particulate disposed over a surface of the transparent substrate; and a light-blocking layer disposed on the surface of the transparent substrate and surrounding the data mark arrangement layer.

18. A recording medium for recording and reproducing information utilizing near field light generated by light incident to an optical head or light irradiated onto the recording medium, the recording medium comprising: a transparent substrate; a data mark arrangement layer containing a dispersed metal particulate disposed over a surface of the transparent substrate; a light-blocking layer disposed over the surface of the transparent substrate, the data mark arrangement layer being disposed over the light-blocking layer; and a light reflecting layer disposed between the surface of the transparent substrate and the light-blocking layer.

19. A recording medium for recording and reproducing information utilizing near field light generated by light incident to an optical head or light irradiated onto the recording medium, the recording medium comprising: a transparent substrate; a data mark arrangement layer containing a dispersed metal particulate disposed over a surface of the transparent substrate; a light-blocking layer disposed over the surface of the transparent substrate, the data mark arrangement layer being disposed over the light-blocking layer; and a light reflecting layer disposed between the surface of the transparent substrate and the data mark arrangement layer.

20. An optical recording device comprising: a near field optical head having a semiconductor substrate and a conical light-passing section formed in the semiconductor substrate and having an optical opening at an apex thereof; a recording medium having a transparent substrate and a layer containing a dispersed metal particulate disposed over a surface of the transparent substrate for interacting with near field light generated by incident light passing through the optical opening of the conical light-passing section to disperse light through the transparent substrate; and a light-blocking layer disposed on the surface of the transparent substrate and surrounding the layer containing the dispersed metal particulate.

21. An optical recording device comprising: a recording medium having a transparent substrate and a layer containing a dispersed metal particulate disposed over a surface of the transparent substrate for interacting with irradiating light to generate near field light; and a near field optical head having a semiconductor substrate and a conical light-passing section for converting near field light generated by the interaction between the irradiating light and the dispersed metal particulate to a detection output light; and a light-blocking layer disposed on the surface of the transparent substrate and surrounding the layer containing the dispersed metal particulate.

* * * * *